United States Patent [19]

DiMatteo

[11] Patent Number: 5,495,916
[45] Date of Patent: Mar. 5, 1996

[54] METHOD AND TOOL FOR QUICKLY DRAINING THE TRANSMISSION FLUID IN AN AUTOMOTIVE VEHICLE

[76] Inventor: John DiMatteo, 1375 Leisure Dr., Hayden Lake, Id. 83835

[21] Appl. No.: 344,872

[22] Filed: Nov. 25, 1994

[51] Int. Cl.$^6$ .............................. F16N 23/00; F16N 31/00
[52] U.S. Cl. ................................. 184/1.5; 184/6.4
[58] Field of Search ................. 184/1.5, 6.4, 108; 137/539; 134/169 A

[56] References Cited

U.S. PATENT DOCUMENTS

| | | | |
|---|---|---|---|
| 3,720,287 | 3/1973 | Martel | 184/1.5 |
| 3,894,556 | 7/1975 | Pareja | 137/539 |
| 4,745,989 | 5/1988 | DiMatteo . | |
| 4,776,430 | 10/1988 | Rule | 184/1.5 |
| 4,977,978 | 12/1990 | Batrice | 184/1.5 |
| 5,062,398 | 11/1991 | Bedi et al. | 184/1.5 |
| 5,291,968 | 3/1994 | Brown | 184/1.5 |
| 5,327,862 | 7/1994 | Bedi | 184/1.5 |
| 5,361,870 | 11/1994 | Courcy | 184/1.5 |

FOREIGN PATENT DOCUMENTS

| | | | |
|---|---|---|---|
| 2363044 | 3/1978 | France | 137/539 |
| 109715 | 8/1980 | Japan | 184/1.5 |
| 72299 | 3/1990 | Japan | 184/1.5 |

OTHER PUBLICATIONS

"Micro–Max" automatic transmission filter kit brochure (no date).

*Primary Examiner*—Edward K. Look
*Assistant Examiner*—Christopher Verdier
*Attorney, Agent, or Firm*—Milton S. Gerstein

[57] ABSTRACT

A method of draining transmission fluid from an automotive vehicle, which vehicle has a transmission-filter element connected to a mounting bracket having an inlet orifice and an outlet orifice. The method includes removing the transmission-filter element from the mounting bracket mounting it to the transmission, and then connecting a transmission-fluid drainage element to the mounting bracket in place of the transmission-filter element.

19 Claims, 3 Drawing Sheets

5,495,916

METHOD AND TOOL FOR QUICKLY DRAINING THE TRANSMISSION FLUID IN AN AUTOMOTIVE VEHICLE

BACKGROUND OF THE INVENTION

The present invention is directed to a method and tool for quickly draining the transmission fluid from a transmission of a motor vehicle. In Applicant's U.S. Pat. No. 4,745,989, there is disclosed a method of using a valve mechanism for draining transmission fluid from a transmission of a motor vehicle, which a valve mechanism is used for draining transmission fluid from a transmission of a motor vehicle without the need of removing the oil pan. The present invention is directed to a further improvement in which the transmission fluid is drained without the need of a valve mechanism as disclosed in U.S. Pat. No. 4,745,989.

The present invention relies upon the existing fluid connections of the transmission housing proper which are connected to a transmission-fluid filter element. Such a conventional transmission-fluid filter element has an inlet opening at its top that is connected to a first orifice or passage of the transmission housing. The transmission fluid enters into the filter-housing by means of the inlet opening, where the fluid is filtered and cleansed. The filtered oil is then pumped out of the filter-housing through an outlet opening also formed in the top of the filter-housing, which outlet opening is substantially adjacent to the fluid-inlet opening of the housing, and which outlet opening is connected to a second orifice or passageway of the transmission housing for directing the filtered oil to the operating parts of the transmission. The present invention utilizes the first orifice of the transmission housing, which communicates with the transmission filter, in order to drain the oil.

SUMMARY OF THE INVENTION

It is, therefore, the primary objective of the present invention to provide a method and a tool for carrying out the method for quickly drain transmission fluid from a transmission by utilizing the existing connection between the transmission and the filter element for the transmission fluid.

Toward these and other ends, according to the method of the invention, in order to drain the fluid from the transmission casing, the existing, mounted filter element is removed from the transmission housing, in order to expose the two orifices to which the openings of the filter element are connected. Thereafter, the transmission-fluid drainage element of the invention is connected to these two, now-exposed orifices in a manner that is similar to the way that the filter element itself is connected to the orifices. The transmission-fluid drainage element of the invention has a housing having a first, drainage passageway that has a first upper opening connected to the first orifice, and a second, lower drain opening that communicates to the exterior of the housing, which second opening communicates with a hose or tubing that directs the drained fluid away from housing to a collection vessel, or the like. The housing also has a second passageway that has an upper opening connected to the second orifice of the transmission, and a second, lower closed end. Mounted within the second passageway is a check valve which normally closes off the upper opening of the second passageway, in order to prevent the drained fluid flowing in the first passageway from entering into and flowing out of the upper opening of the second passageway. The check valve is spring-biased to close off the upper opening of the second passageway, for safety reasons. The spring bias may be overcome if the transmission-fluid drainage element of the invention is accidentally mounted in reverse, where the upper opening of the first passageway is connected to the second orifice of the transmission and the upper opening of the second passageway is connected to the first orifice of the transmission. The pressure from the flowing fluid causes the check valve to move downwardly against the spring bias, whereby the fluid may be allowed to flow within the second passageway. Since there is a channel connecting the first and second passageways, the fluid in the second passageway will exit into the first passageway and exit through the lower, exterior tubing connected to the lower opening of the first passageway. Since the flow of fluid will be considerably slower when the connections are reversed, such will serve as an indicator, so that one will realize that the connections have been reversed, and indicate to him correct the error. If this safety feature were not present, then the pressure building up at the outlet due to the wrong connection could cause the connections between the orifice and the opening of the transmission-fluid drainage element of the invention to break loose, causing the oil to be sprayed in all directions.

BRIEF DESCRIPTION OF THE DRAWING

The invention will be more readily understood with reference to the accompanying drawing, wherein.

DETAILED DESCRIPTION OF THE INVENTION

Figure 3:
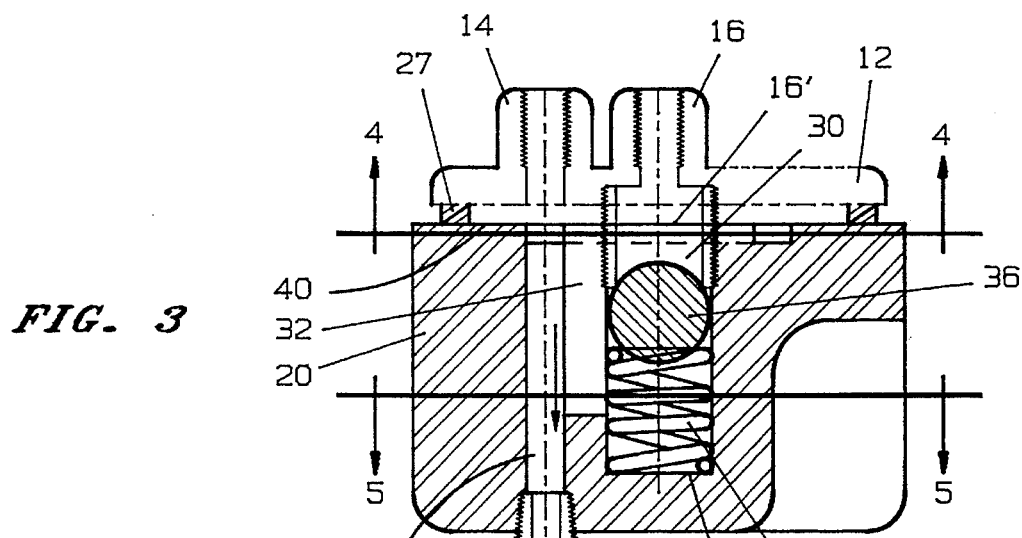
FIG. 3 is a vertical cross-sectional view through the transmission-fluid drainage element of the invention of FIG. 1.
Figure 4:
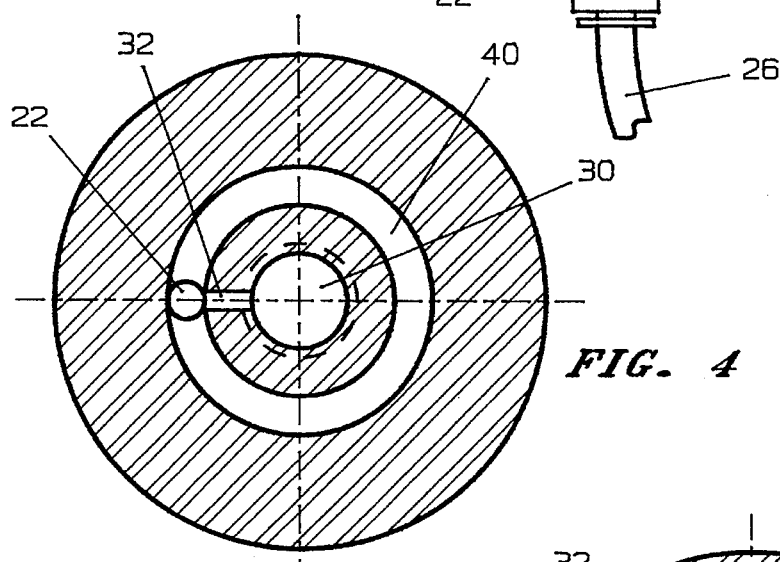
FIG. 4 is a cross-sectional view taken along line 4—4 of FIG. 3.
Figure 5:
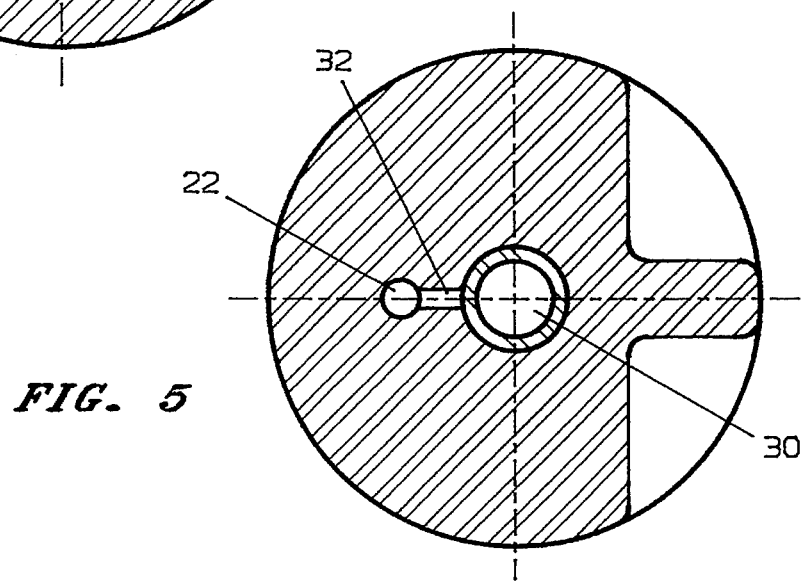
FIG. 5 is a cross-sectional view taken along line 5—5 of FIG. 3.

Referring now to the drawings in greater detail, where like reference numerals indicate like parts, the transmission-fluid drainage element of the invention is indicated generally by reference numeral 10. The transmission-fluid drainage element 10 is directly connected to the conventional, automatic-transmission, filter-element mounting bracket 12 that constitutes part of the automatic transmission housing, which mounting bracket 12 has main frame 12' that terminates in an upturned flange 12" for connection to the exterior of the transmission casing. The mounting bracket 12 has a first, inlet orifice, or sleeve, 14, and a second, outlet orifice, or sleeve, 16, each of which has upper interior threads, as seen in FIG. 3, for receiving appropriate hose-connections. The outlet orifice 16 has a downwardly-extending, exterior-threaded connecting sleeve 16' by which a conventional filter-element (not shown) is mounted to the bracket, with the filter-element having a cooperating, threaded opening for receiving the sleeve 16'. According to the invention, the transmission-fluid drainage element of the invention is temporarily used in place of the conventional filter-element when it is desired to drain the fluid from the automatic transmission. This is achieved by unscrewing the filter-element from its connection with the sleeve 16' of the mounting bracket 12, and mounting the transmission-fluid drainage element 10 of the invention in its place, as more fully set forth hereinbelow. In order to drain the fluid through the transmission-fluid drainage element 10 of the invention, the engine is started, which pumps the oil out therethrough.

Figure 1:
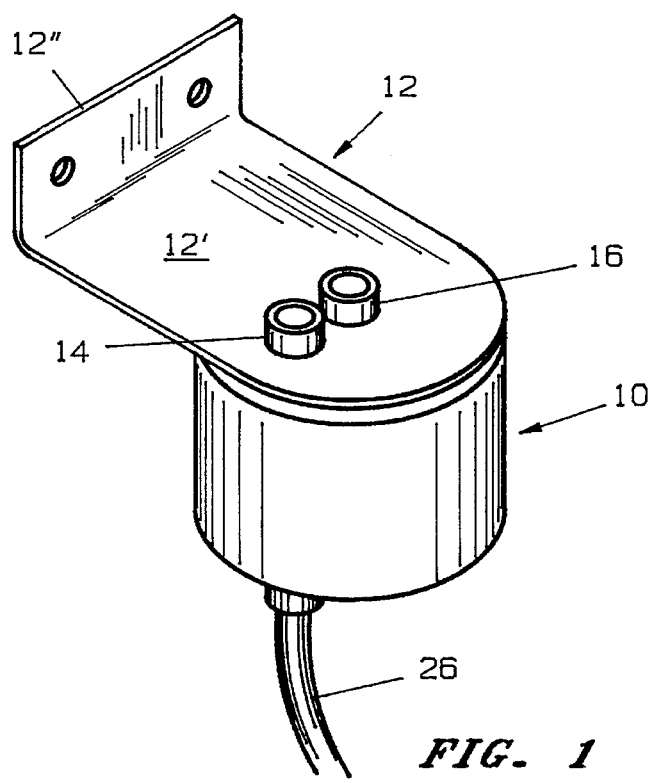
FIG. 1 is an isometric view of the transmission-fluid drainage element of the invention shown connected to the existing filter-mounting bracket of a transmission instead of the usually-mounted filter-element.
Figure 2:
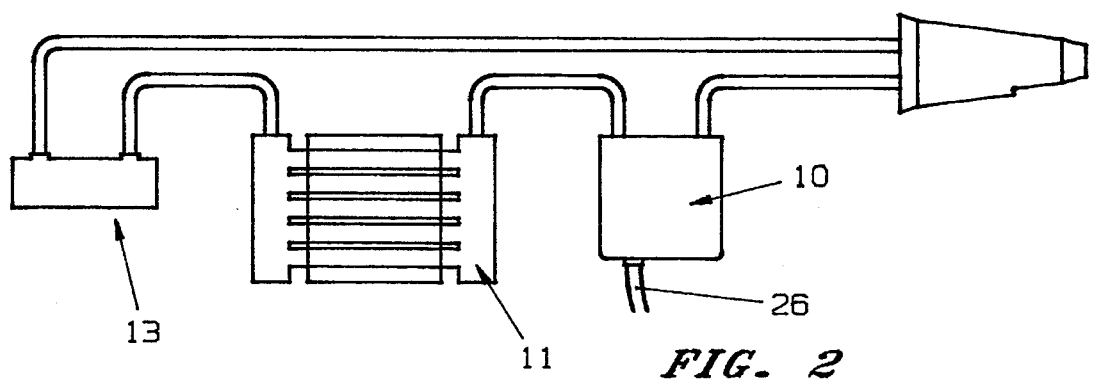
FIG. 2 is a schematic view showing the position of the transmission-fluid drainage element of the invention relative to other parts of an automotive vehicle.

FIG. 2 shows a general schematic as to the placement of the transmission-fluid drainage element of the invention. The inlet of the transmission-fluid drainage element 10 is coupled to an auxiliary radiator 11, if present, which in turn is connected to the main radiator 13. The outlet of the transmission-fluid drainage element 10 is coupled to the automatic transmission proper. Both connections of the transmission-fluid drainage element 10 is achieved by means of the mounting bracket 12, in exactly the same manner as the conventional filter-element is mounted thereto.

Figure 6:
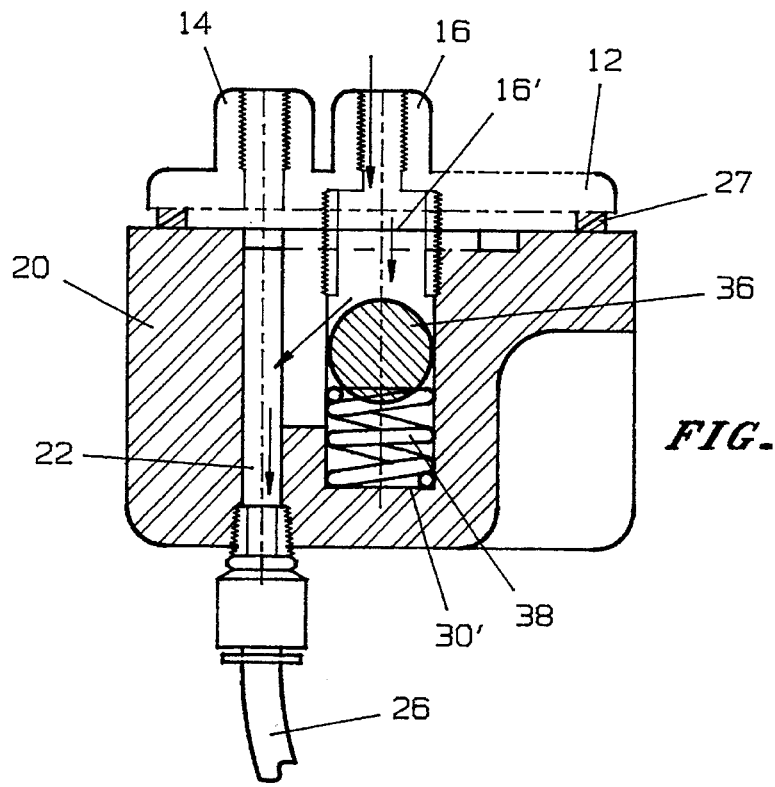
FIG. 6 is cross-sectional view similar to FIG. 3, but showing what occurs if the transmission-fluid drainage element of the invention is accidentally mounted in reverse.

Referring to FIGS. 3–6, transmission-fluid drainage element 10 of the invention is a cast-steel element having a main housing 20, in the interior of which is formed a first, inlet passageway 22 terminating in an upper, open end and a lower, open end. The upper, open end communicates with the inlet orifice 14, while the lower, open end communicates to the ambient by means of a drainage hose 26 suitably mounted in the lower opening. The transmission oil is directed to a collecting vessel or can for subsequent disposal through hose 26. The upper surface of the transmission-fluid drainage element 10 is sealed against the lower surface of the mounting bracket 12 by means of a sealing ring 27. The interior of the housing 20, also, has a second passageway 30 that has an upper open end that threadingly receives therein the male threaded sleeve 16' of the outlet 16 of the mounting bracket 12, in the same manner as the filter-element does, and a lower closed end 30'. The interior of the housing, also, has a connecting channel 32 that fluidly connects the two passageways together, for the reasons detailed below. Mounted within the second passageway 30 is a ball check valve 36 that is upwardly biased to close off the upper opening by means of compression spring 38. In normal use, the transmission oil will be drained out by flowing directly from the inlet orifice 14, through the first inlet passageway 22 and then out through the drainage hose 26. The check valve 36 prevents any of the oil from exiting through the outlet 16. The biassed check valve 36 also serves a safety function, in the case where the transmission-fluid drainage element 10 is incorrectly mounted in reverse; that is, if somehow the upper opening of the second passageway 30 were unintentionally connected to the inlet orifice 14, then the pressure from the inflowing oil would overcome the biassing force of the spring 38, to push the ball check valve downwardly, so that the oil may still reach the drainage hose 26 by means of the connecting channel 32, as seen in FIG. 6. If this safety feature were not present, then the pressure build-up could cause hose connections to break, to thus cause oil to be sprayed in all directions. Thus, the biased ball check valve serves two functions; it prevents the oil from exiting through the outlet during normal connections, and allows the oil to be drained if the transmission-fluid drainage element 10 is mounted incorrectly.

The spacing of the upper openings of the two passageways 22 and 30 are the same as the spacing of the two orifices 14 and 16 of the mounting bracket 12, so that, when the transmission-fluid drainage 10 is screwed onto the sleeve 16' of the outlet orifice 16, the upper opening of the inlet passageway 22 will be located directly under the inlet orifice 14 of the mounting bracket 12. However, depending upon the type of vehicle, it cannot be assured that the transmission-fluid drainage element 10 will be rotated the precise amount so that the upper opening of the inlet passageway 20 is in direct, linear alignment with the inlet orifice 14. Therefore, the upper surface of the transmission-fluid drainage element 10 is provided with a circular, annular trough 40. At the lowest level in the trough 40, there is located the upper opening of the inlet passageway 22. Thus, even if the upper opening of the inlet passageway 22 is not in direct linear alignment with the inlet orifice 14, and even if they are 180 degrees out of alignment, the oil exiting the inlet orifice 14 will flow directly onto the circular trough, and from there will be directed downwardly to the upper opening of the passageway 22, for drainage out through the drainage hose 26.

Figure 7:
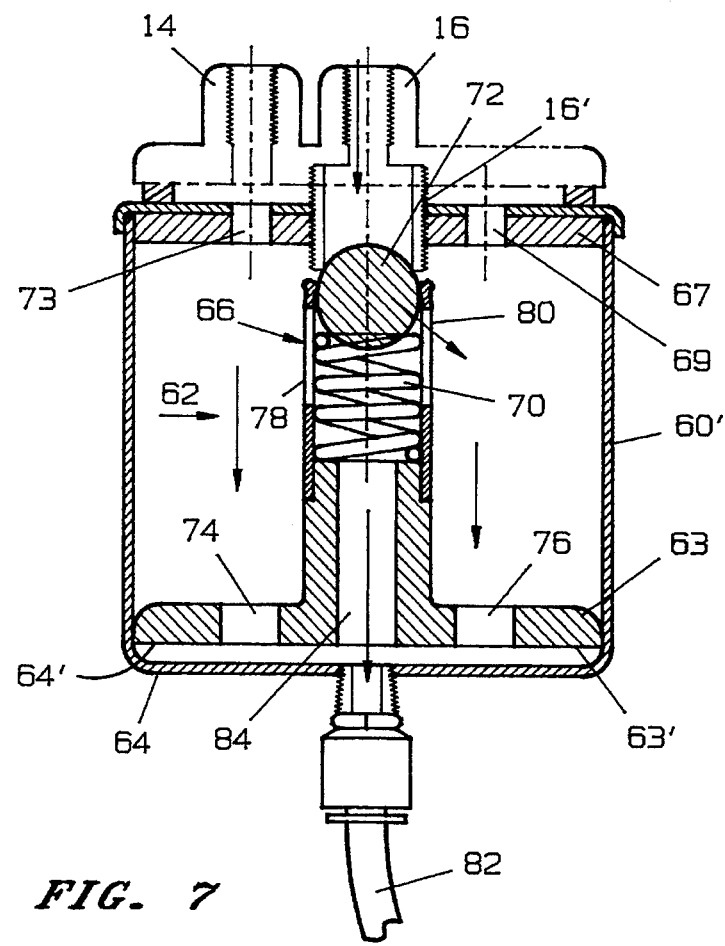
FIG. 7 is a vertical cross-sectional view of a modification of the transmission-fluid drainage element of the invention.

FIG. 7 shows a modification 60 of the transmission-fluid drainage element of the invention. In this modification, the tool 60 of the invention resembles the filter-element permanently mounted to the transmission which it replaces. Instead of the tool 60 being cast like the tool 10 of FIGS. 3–6, the tool 60 is assembled using the basic outer housing of the filter-element, and by spot-welding a check valve assembly 62 in the housing. As seen in FIG. 7, the tool 60 has a main housing 60' that is of the same, general cylindrical shape as the outer cover-housing of a conventional filter-assembly, which the tool of the invention temporarily replaces when draining the fluid. The housing 60' has a bottom wall 64 defining an interior surface 64' adjacent to which is mounted, as by spot-welding, a lower flange 63 of check valve assembly 62. The check-valve assembly consists of an upstanding, central column-like member 66 mounted in the axially center of the housing 60' which column 66 projects upwardly from the lower flange 63 and has a hollow, upper interior section in which is mounted a biassing spring 70 for upwardly forcing ball check valve 72 against the lower opening of the sleeve 16' which projects downwardly from the second outlet orifice of the transmission's mounting bracket 12, as described above with reference to FIGS. 1–6. The lower flange 63 is provided with a pair of lower openings 74, 76, while the column 66 has a pair of upper side-openings 78, 80, which openings allow fluid entering through the outlet to exit the column member 66 and exit through the exit drainage hose 82, if the tool 60 has been incorrectly mounted in reverse, as described previously. The column 66 also has a bottom, central through-passage 84 which communicates with the hollow interior of the upper section of the column, in order to direct the fluid to the drainage hose 82. When the tool 60 has been properly connected, the inflowing oil from the inlet orifice and inlet opening 73 will flow directly to the lower openings 74, 76 for exit through the through-passage 84 and the drainage hose 82 after accumulating in the volume defined between the lower surface 63' of the lower flange 63 and the bottom wall 64 of the housing. The tool 60 also has an upper flange 67 which has on its upper surface a circular or annular trough, like the trough 32 of the first embodiment, in order to ensure that all oil exiting from the inlet orifice is received through the inlet opening 73. The upper flange 67 also has one additional hole 69 which directs the oil accumulated in the annular trough into the interior of the housing and thence to the drainage hose 82 via the lower openings 74, 76.

While specific embodiments of the invention have been shown and described, it is to be understood that numerous changes and modifications may be made therein without departing from the scope, spirit and intent of the invention as set forth in the appended claims.

What I claim is:

1. A method of draining transmission fluid from an automotive vehicle, which vehicle has a transmission-filter element connected to a mounting bracket having an inlet orifice and an outlet orifice, said method comprising:

(a) removing the transmission-filter element from the mounting bracket; and (b) after said step (a), connecting a transmission-fluid drainage element to the mounting bracket in place of the transmission-filter element;

said transmission-fluid drainage element having a first passageway having an upper inlet opening and a second passageway having an upper outlet opening; said step (b) comprising connecting the upper outlet opening to the outlet orifice of the mounting bracket; and draining the fluid through the upper inlet opening of the first passageway to exterior of the drainage element.

2. The method according to claim 1, wherein said automotive vehicle comprises an engine, said step of draining comprises running the engine the transmission fluid of which is being changed.

3. The method according to claim 1, wherein said step of connecting the upper outlet opening to the outlet orifice of the mounting bracket comprises preventing the fluid flowing out through the first passageway from exiting through the upper outlet opening.

4. The method according to claim 3, wherein said step of preventing comprises allowing fluid to enter into the second passageway via the second upper outlet if the transmission-fluid drainage element has been incorrectly connected to the mounting bracket; said step of draining also comprising directing fluid entering the upper outlet of the second passageway from the outlet orifice to flow out through the first passageway.

5. A transmission-fluid drainage element for use in draining automatic transmission fluid from an automotive vehicle, which vehicle has a mounting bracket with an inlet and an outlet spaced a specified distance from the inlet for an automatic-transmission filter-element, comprising:

a main housing having an upper surface and a lower surface;

an inlet opening and an outlet opening formed in said upper surface;

at least one passageway extending between said upper and lower surfaces, said passageway being in fluid communication with said upper inlet opening, and having a lower opening;

tube-means operatively associated with said lower opening of said passageway for directing drained transmission fluid away from said at least one passageway;

said upper inlet opening and said upper outlet opening being spaced apart a specified distance substantially equal to the distance between the inlet and the outlet of the mounting bracket for an automatic-transmission filter-element.

6. The transmission-fluid drainage element for use in draining automatic transmission fluid according to claim 5, further comprising means for preventing the drained fluid flowing in said passageway from exiting through said upper outlet opening.

7. The transmission-fluid drainage element for use in draining automatic transmission fluid according to claim 6, wherein said means for preventing comprises a check valve, and a spring for biassing said check valve against said upper outlet opening of said upper surface.

8. The transmission-fluid drainage element for use in draining automatic transmission fluid according to claim 6, wherein said means for preventing comprises an upstanding column having at least an upper hollow section in fluid communication with said outlet opening, and a check valve and spring for biassing said check valve against said upper outlet opening mounted in said upper hollow section.

9. The transmission-fluid drainage element for use in draining automatic transmission fluid according to claim 8, wherein said column member further comprises at least one lower side opening, and an exit passageway in fluid communication between said lower side opening and said tube-means, whereby fluid being drained exits.

10. The transmission-fluid drainage element for use in draining automatic transmission fluid according to claim 9, wherein said column member further comprises at least one upper opening in fluid communication with the interior of said upper hollow section for draining the fluid entering through said outlet opening.

11. The transmission-fluid drainage element for use in draining automatic transmission fluid according to claim 5, comprising another, inner passageway extending between said upper and lower surfaces, and having said upper outlet opening thereto, said another passageway having a lower closed end; said housing further comprising a connecting channel that fluidly connects said passageways, so that fluid entering said another passageway will flow into said one passageway.

12. The transmission-fluid drainage element for use in draining automatic transmission fluid according to claim 5, wherein said upper surface of said housing comprises an annular trough in which said upper inlet opening is positioned, so that any fluid exiting from the inlet of said mounting bracket will be directed to said upper inlet opening.

13. The transmission-fluid drainage element for use in draining automatic transmission fluid according to claim 12, wherein said annular trough extends for 360 degrees about said upper surface; said outlet opening being located on said upper surface interiorly of said annular trough.

14. In an automotive vehicle having an automatic transmission, a transmission-filter element connected to a mounting bracket having an inlet orifice and an outlet orifice spaced apart a specified distance, the improvement comprising:

a transmission-fluid drainage element for use in place of said transmission-filter element when draining transmission fluid;

said transmission-fluid drainage element comprising a main housing having an upper surface and a lower surface;

an inlet opening and an outlet opening formed in said upper surface;

at least one passageway extending between said upper and lower surfaces, said passageway being in fluid communication with said upper inlet opening and having a lower opening;

tube-means operatively associated with said lower opening of said passageway for directing drained transmission fluid away from said at least one passageway;

said upper inlet opening and said upper outlet opening being spaced apart a specified distance substantially equal to the distance between the outlet and the inlet of said mounting bracket.

15. The transmission-fluid drainage element for use in draining automatic transmission fluid according to claim 14, further comprising means for preventing the drained fluid flowing in said passageway from exiting through said upper outlet opening.

16. The transmission-fluid drainage element for use in draining automatic transmission fluid according to claim 15, wherein said means for preventing comprises a check valve, and a spring for biassing said check valve against said upper outlet opening.

17. The transmission-fluid drainage element for use in draining automatic transmission fluid according to claim 15, wherein said means for preventing comprises an upstanding column having at least an upper hollow section in fluid communication with said outlet opening, and a check valve and spring for biassing said check valve against said upper outlet opening mounted in said upper hollow section.

18. The transmission-fluid drainage element for use in draining automatic transmission fluid according to claim 14, comprising another, inner passageway extending between said upper and lower surfaces, and having said upper outlet opening thereto, said another passageway having a lower closed end; said housing further comprising a connecting channel that fluidly connects said passageways, so that fluid entering said another passageway will flow into said one passageway.

19. The transmission-fluid drainage element for use in draining automatic transmission fluid according to claim 14, wherein said upper surface of said housing comprises an annular trough in which said upper inlet opening is positioned, so that any fluid exiting from the inlet of said mounting bracket will be directed to said upper inlet opening.

\* \* \* \* \*